United States Patent [19]
de Carbon

[11] 3,844,389
[45] Oct. 29, 1974

[54] PISTONS FOR HYDRAULIC SHOCK ABSORBERS

[76] Inventor: Christian Bourcier de Carbon, 64 Blvd. Maurice-Barres, Neuilly-sur-Seine, France

[22] Filed: July 17, 1972

[21] Appl. No.: 272,215

[30] Foreign Application Priority Data
July 21, 1971 France .............................. 71.26651

[52] U.S. Cl............... 188/322, 137/493.8, 137/504, 137/513.3, 188/282
[51] Int. Cl............................................. F16f 9/34
[58] Field of Search................... 188/282, 317, 322; 137/513.3, 504, 493, 493.8

[56] References Cited
UNITED STATES PATENTS
| | | | |
|---|---|---|---|
| 2,320,697 | 6/1943 | Binder | 137/493.8 X |
| 3,029,903 | 4/1962 | Wasdell | 188/322 X |
| 3,312,312 | 4/1967 | De Carbon | 188/317 |

FOREIGN PATENTS OR APPLICATIONS
| | | | |
|---|---|---|---|
| 1,376,487 | 9/1964 | France | 137/493 |
| 1,000,398 | 8/1965 | Great Britain | 137/493 |

*Primary Examiner*—George E. A. Halvosa
*Attorney, Agent, or Firm*—Watson, Cole, Grindle & Watson

[57] ABSTRACT

The shock absorber piston has its annular series of fluid passageways controlled by an annular floating valve disk, an outer marginal portion of which can seat upon a circular bearing edge formed on lower face of the piston, and an inner marginal portion can seat upon the outer marginal portion of a bearing washer rigid with the piston rod. A thin centering washer of the approximately the thickness of the valve disk is rigid with the piston and is seated upon the bearing washer and is normally substantially coplanar with the valve disk and has an absolute minimum of clearance therewith. The periphery of the centering washer is provided with a series of notches to constitute passages whose section is proportionate to the lift of the valve disk at its central part.

1 Claim, 4 Drawing Figures

PATENTED OCT 29 1974 3,844,389
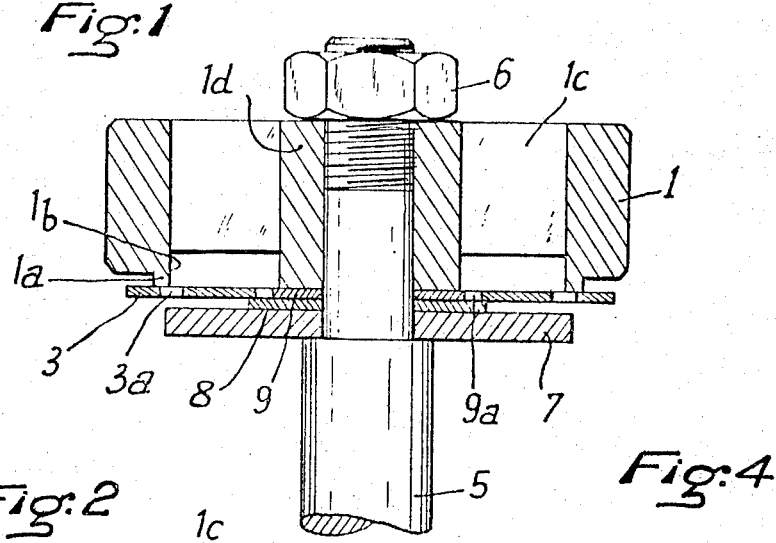
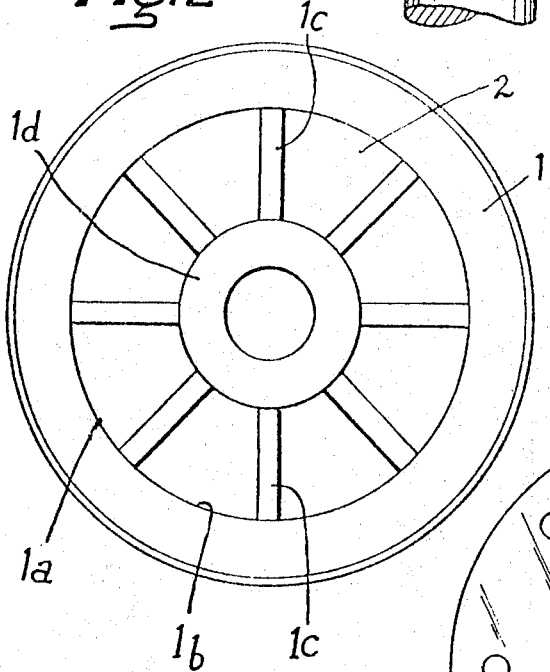
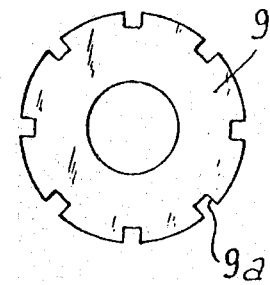
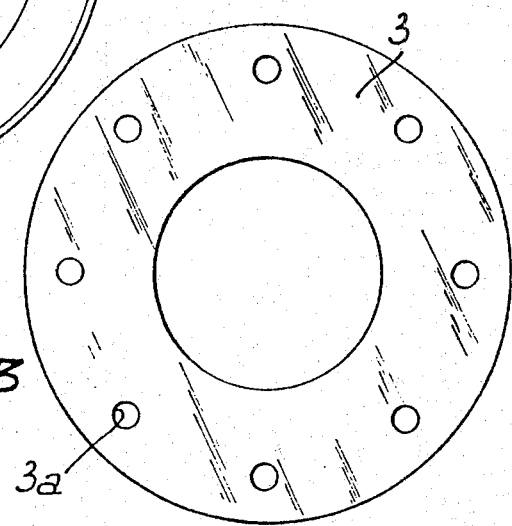

PISTONS FOR HYDRAULIC SHOCK ABSORBERS

The present invention relates to improvements in pistons for hydraulic shock absorbers, especially the single tube type.

For these shock absorbers it is known to provide as a flow control element a floating, double acting valve in the form of a disk or a pile of steel sheet disks, said disks or pile of disks being applied on the one hand on a circular bearing surface on one of the faces of the piston of the shock absorber and on the other hand on a flat bearing washer, providing a centering disk in the form of a second flat washer, of lesser diameter than that of the bearing washer, the said centering washer being disposed between the body of the piston and the bearing washer. It is to be noted that the centering washer only has this function at the moment of assembly of the various elements, since it has been found that in the course of operation the hydraulic forces maintain the valve in position even if its inner edge is completely disengaged from the centering washer. The above arrangements are described in my U.S. Pat. No. 3,312,312 under the same name with the special feature that the play between the valve and the centering washer must then be controlled with precision and must be of the order of ten hundredths to twenty-five hundredths of a millimeter. This paly is intended to procure passage with well determined section, the said passage being open to oil as soon as the valve is lifted by less than one-tenth of a millimeter. As mentioned in the said U.S. Pat. No. 3,312,312 this arrangement allows the following result:

At low speeds the permanent passages in the piston suffice to insure the flow of liquid and the valve remains motionless between these two bearing surfaces. During this phase the resistance of the piston to displacement increases more rapidly than the speed of the piston. Starting at a certain speed, the valve begins to lift rapidly, freeing between the centering washer and the interior hollowing of the valve, the passage section which has already been mentioned. Resistance then increases less rapidly than the speed of the piston, then begins to grow rapidly, up to the moment at which the lower edge of the valve reaches the level of the upper edge of the centering washer. From this moment the section of passage between the washer and the valve increases very rapidly and resistance, while continuing to increase, slows dow so that it increases less rapidly than the speed.

It is therefore to be seen that the characteristic of the shock absorber depends on the one hand the play between the valve and the bearing washer and on the other hand upon the disposition of the permanent passages, and it may be especially observed that the curve of response is not exactly linear. However, to have perfect action on the part of the shock absorber and satisfactory functioning, it is important on the one hand to have a linear curve of response and on the other hand it is necessary to be in precise control of the passage which opens with the least raising of the valve. It is evident, however, that the precise play between the valve and the centering washer, which must be of the order from ten to twenty-five hundredths of a millimeter, is very difficult to manage because of manufacturing tolerances.

The new invention is intended to improve the characteristic curve of shock absorbers of the mentioned type by allowing better linearity of the response curve. It consists in providing practically zero play between the valve and its centering washer and in making at the periphery of this centering washer a certain number of notches or recesses so as thus to constitute passages whose section is rigorously in proportion to the lift of the valve in its central part.

a. With practically zero play there is meant such small clearance as is allowed by manufacture and assembly of the pieces. In practice this will be of the order of several hundredths, for example five hundredths of a millimeter.

We know that at a specific pressure the flow through a thin slit is in inverse proportion on the one hand to the viscosity of the oil and on the other hand to the center of the thickness of the slit. As a result, with specified higher play, the flow of oil between the oil and the centering washer is practically zero beyond the notches.

b. The notches are preferably distributed uniformly over the periphery of the centering washer to insure good distribution of constraints. For this reason they will be equal in number or greater than two, although it is not outside the scope of the invention to provide a single notch.

c. The permanent passages are made in the form of piercings through the said valve, the said perforations being disposed so as to be tangent or better still to be partly masked by the bearing edge for the valve provided on the piston.

d. The bearing surfaces and the piston on the valve on the one hand and on the centering washer on the other hand are preferably rigorously in the same plane, and the thickness of the washer is less than that of the valve so as to have a prestressing effect on the valve.

e. By retaining disk with radius which is close to the distance to the axis of the permanent passages (preferably a little bit more) in turn supports the bearing washer on which the centering washer rests and it plays a role of a vibration damper for the valve vibration.

f. The diameter of the bearing of the valve on the piston and the outer diameter of the valve are in an optimum ratio between 75 percent and 85 percent, g. The piston is made in the form of a sleeve connected to an external annulus by radial partitions.

As example and to facilitate comprehension of the invention there are in the attached drawings in FIG. 1 a schematic view in section of a shock absorber piston with valves according to the invention.

FIG. 2 a top view of a shock absorber piston of FIG. 1.

FIG. 3 a top view of the floating valve.

FIG. 4 a top view of the centering washer.

With reference to these drawings we see that the shock absorber piston 1 is mounted on piston rod 5 and tightened by nut 6 making a stack of retaining disk 7, bearing washer 8, centering washer 9 and the piston by means of its central part 1d. Valve 3 in the form of an annulus of steel sheet rests with its inner edge on the outer edge of the bearing washer 8 and is centered by a centering washer 9, the bearing on the piston being effected on the bearing edge 1a that is provided for this purpose. The clearance between centering washer 9 and valve 3 is reduced to a strict minimum, practically to zero, keeping it just enough to allow free movement of valve 3. In practice valve 3 and centering washer 9 are made with clearance which is as little as manufacturing techniques and piece assembly allows, which is to say a play of a few hundredths of a millimeter, for example five hundredths.

The permanent passages can be made in the form of passages 3a in valve 3.

Centering washer 9 presents peripheral recesses or notches 9a whose number is a function of the characteristics that are sought for the shock absorber and it is these notches 9a alone which determine the section of passage presented to the fluid when the inner edge of valve 3 begins to rise. It is obvious that this section of passage is rigorously in proportion to the lift and that there is thus obtained the better linearity that is sought for the characteristic curve for the shock absorber in this field of operation.

It is to be noted that in any case when the inner edge of valve 3 is completely disengaged from centering washer 9 the characteristic curve is as described with respect to my U.S. Pat. No. 3,312,312.

The notches can be uniformly distributed on the periphery of the washer as shown.

An important advantage of the invention is that we are no longer dependent upon manufacturing tolerances concerning the play between centering washer 9 and valve 3. In prior manufacture according to French Pat. No. 1,542,408 the precision of the play between valve and washer had an important role and there was found a noticeable scatter in manufacturing results due to manufacturing tolerances with respect to this play.

With the arrangement of the present invention the oil flow between valve and centering washer is practically zero beyond the flow passing through the notches—the play between washer and valve thus has no role in regulation of this flow—consequently precision of manufacture is greatly improved and there is practically no scatter in the results of manufacture.

On the other hand this technique considerably reduces thermal fluctuations as a result of the improvement of flow conditions between the valve and the centering washer and this constitutes an essential improvement in the shock absorber.

It is also to be noted that piston 1 with a central part 1d connected to the outer part by radial partition 1c allows production of passages 2 whose section is maximum for the given dimension of the piston.

Retaining disk 7 supports centering washer 9 by means of a bearing washer 8 whose diameter is slightly larger, sufficient to furnish bearing for the inner edge of the valve.

According to the invention, disk 7 is of large diameter.

This disposition regularizes the oil flow along the valve and imparts thus to disk 7 the role of vibration damper for the valve vibrations. Consequently there is suppression of all vibration or whistling of the valve which occurs in certain shock absorbers, which is to say that there is an especially quiet functioning.

The permissible ratio between the bearing diameter of the valve (which is to say the internal diameter of the bearing edge 1a) and the diameter of the valve is preferably beteen 0.80 and 0.90 approximately.

These limits are very close as we see. Respecting them allows clear improvement of the mechanical behavior of the valve.

I claim:

1. Improvement in piston construction for hydraulic shock absorbers, especially of the single tube type: said construction comprising a piston body carried by the shouldered end of a piston rod, said piston body including a central sleeve forming the hub portion of said piston body, surrounding the rod, and clamped between the rod shoulder and the usual end nut arrangement; and an outer annular portion between which and said sleeve are the usual free flow passages through the piston body; a flat annular bearing washer clamped between the piston body and the rod shoulder; a floating double-acting valve in the form of at least one flat annular disk; the outer portion of said valve adapted to bear against a circular bearing edge on said outer annular portion of the piston body and the inner portion of the valve adapted to bear upon the outer portion of said flat bearing washer; a flat centering washer clamped between said piston sleeve and said bearing washer and being of lesser diameter than said bearing washer and of a thickness of the approximate order of that of the valve disk, there being practically zero clearance between the centering washer and the floating valve, whereby without additional provision fluid could not pass when the valve and centering disks are in alignment; and notches provided in the outer periphery of the centering washer so as to constitute passages whose section is rigorously in proportion to the lift of the valve in its central part; the outer diameter of the centering washer and thus the inner diameter of valve being greater than the diameter of said piston sleeve; said central sleeve being joined to said outer annular portion by flat relatively narrow radial partitions.

* * * * *